Jan. 27, 1953  T. PENKOFF ET AL  2,626,491
FIXTURE FOR GRINDING THREAD CUTTING TOOLS AND THE LIKE
Filed Nov. 10, 1950  2 SHEETS—SHEET 1
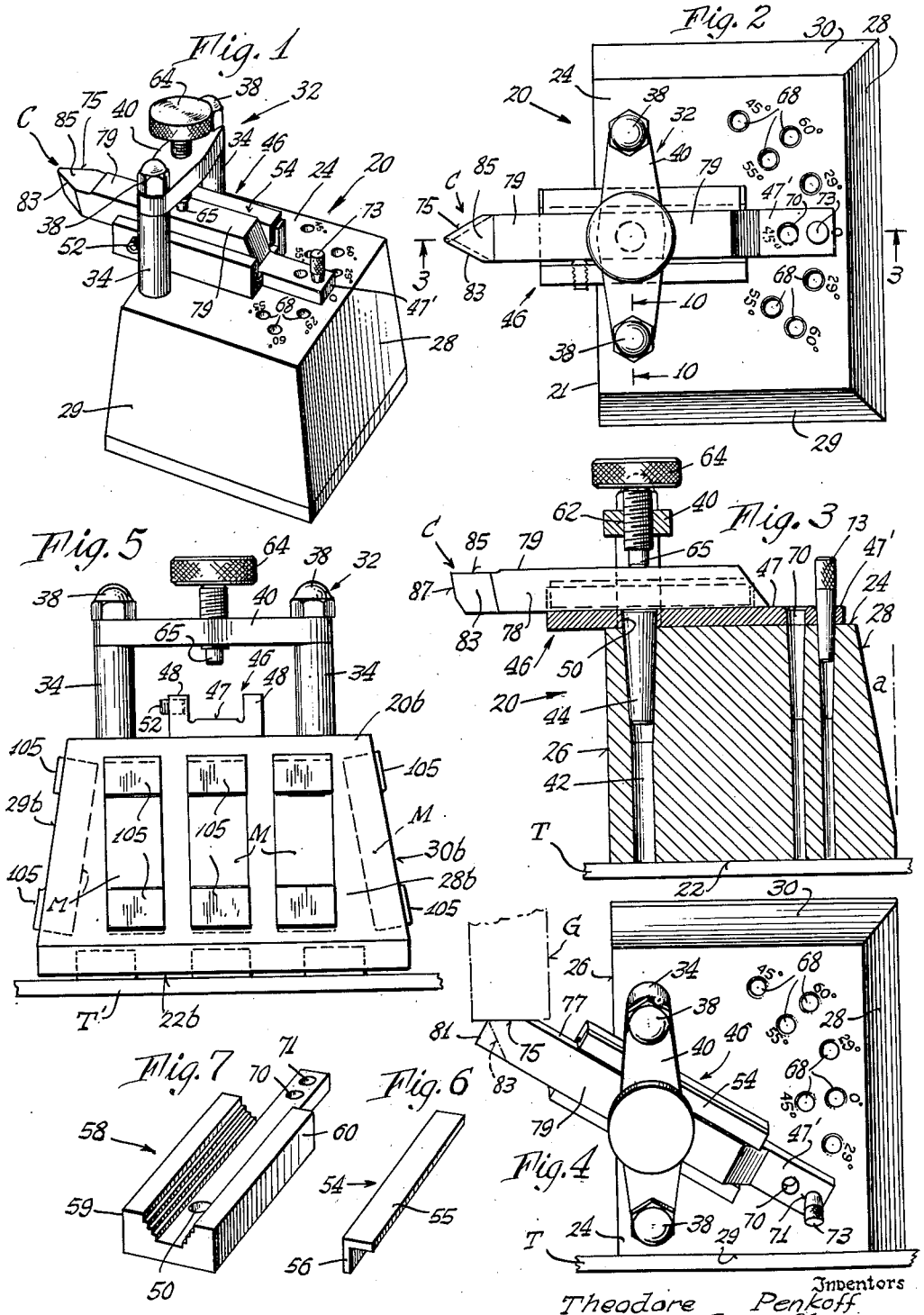
Inventors
Theodore Penkoff
Leo Egoroff
By Johnson and Kline
Attorneys

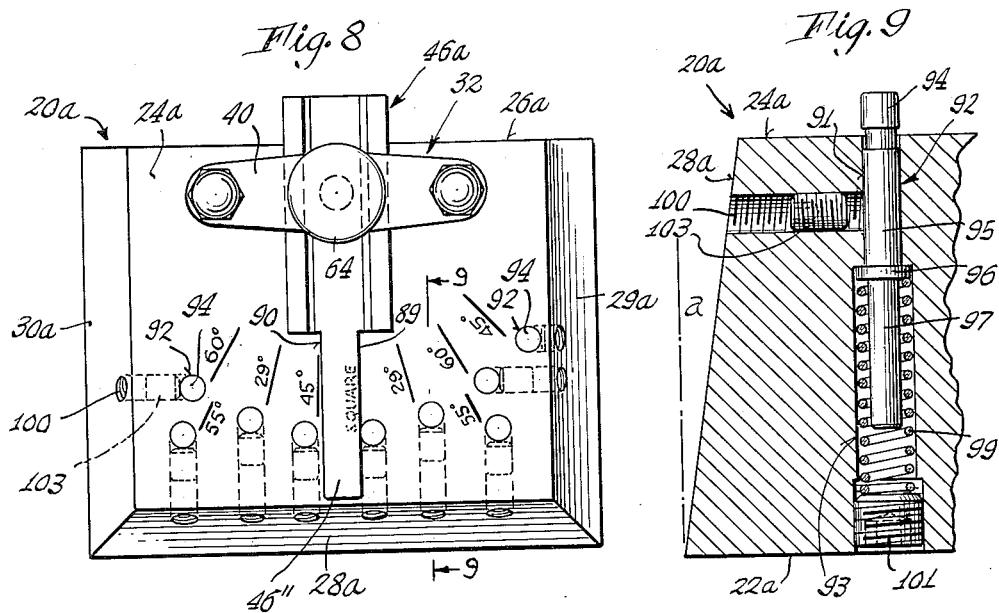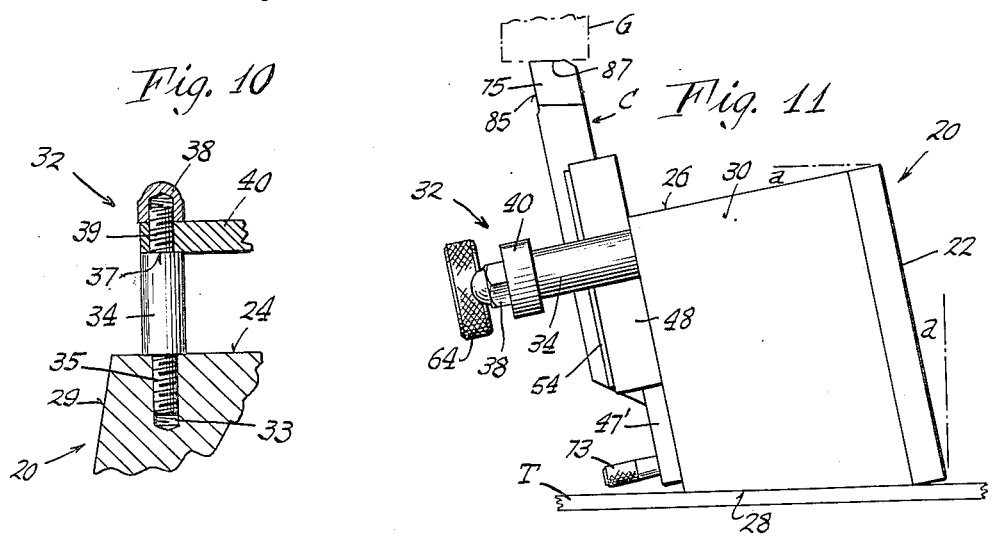

Patented Jan. 27, 1953

2,626,491

UNITED STATES PATENT OFFICE 2,626,491

FIXTURE FOR GRINDING THREAD CUTTING TOOLS AND THE LIKE

Theodore Penkoff, Copiague, and Leo Egoroff, Huntington, N. Y.

Application November 10, 1950, Serial No. 194,998

17 Claims. (Cl. 51—220)

This invention relates to fixtures for holding tools and more particularly to fixtures for holding thread cutting tools or tool bits for the proper grinding thereof.

Thread cutting tools are usually formed from lengths of specially made and treated tool steels such as cobalt tool steels, carbide tool steels, etc. The front portions of two sides of these lengths of tool steel are ground down on a surface grinder, for example, to provide two converging, inwardly inclined side surfaces and the top is ground down to provide a top face or surface which intersects with the side surfaces to form cutting edges. If desired, a flat face may be formed at the front of the tool bit. The lengths of tool steel are normally held in tool holders or fixtures during the time they are being ground to form the inwardly inclined surfaces and the proper cutting edges. The cutting edges are, of course, essential for the proper cutting and forming of the threads by the tool and the inclined surfaces must be inwardly slanted away from the cutting edges to provide the proper clearance for the tool so as to avoid friction and interference between the object being threaded and the body of the tool.

In the case of thread cutting tools, there are several different types of threads in use and it is therefore necessary to grind as many different types of corresponding thread cutting tools. This is due to the fact that the cutting outline of the tool will match the outline of the threads being cut and thus there must necessarily be one cutting tool for each and every type of thread to be cut.

Prior fixtures have attempted to provide holding means for the grinding of all these differently shaped thread cutting tools but they have been complicated and expensive and have usually been constructed so that the thread cutting tools must be carefully and manually adjusted in the fixtures in order to be ground to the desired shape. Other prior fixtures abandoned the thought of a fixture for universal use for all thread cutting tools and merely provided holding means for tools for one or perhaps two of the different types of threads. These fixtures were individually not as complicated as the all-purpose fixtures and were less expensive. However, several different fixtures would be required in order to grind all the necessary tools so that, as a result, the total expense proved to be as great, if not greater than that required for one all-purpose fixture. Furthermore, the presence of several different tool holding fixtures rather than one all-purpose fixture detracted from the simplicity of use thereof. Thus, up to the present time, there have been no simple or inexpensive universal fixtures available to hold the tool bits in the various positions necessary to grind all or substantially all of the various types of thread cutting tools.

It is a purpose of the present invention to provide for a universal tool holding fixture whereby thread cutting tools or tool bits may be easily and quickly positioned to be ground into shapes having cutting edges for the forming of any of the standard types of threads.

It is a further purpose of the present invention to provide a universal fixture for holding thread cutting tools for proper grinding, which fixture is capable of being easily mounted and quickly set to hold the tool in various positions so that it can be ground to a predetermined standard shape.

It is a still further purpose of the present invention to provide a universal fixture for holding thread cutting tools, which fixture is capable of automatically introducing the necessary and proper clearance angles required for the cutting of threads by the tool bit.

Another purpose of the present invention is the provision of a tool holding fixture by means of which tools bits may be accurately positioned therein relative to a grinding wheel whereby the various faces of the tool bit or thread cutting tool may be ground without the necessity of any complicated changes or adjustments of the tool bit during the grinding operation.

A feature of the present invention is the inexpensive nature of the tool holding fixture and the facility of its use.

Another feature of the present invention is the simplicity and rugged nature of its one-piece construction and the ease and readiness with which the tool bit may be secured in or removed from the fixture.

Still another feature of the present invention is the provision of a spacing aligner whereby tool bits of different sizes may be quickly and easily positioned and centered for proper grinding.

Other purposes and features of the present invention will appear in the following description of a preferred embodiment thereof referring to the accompanying drawings, in which:

Figure 1 is a perspective view of the tool holding fixture of the present invention, showing the completely ground tool bit.

Fig. 2 is a top plan view of the tool holding fixture of the present invention, showing the completely ground tool bit.

Fig. 3 is a cross-sectional view of the tool holding fixture, taken on the line 3—3 of Fig. 2.

Fig. 4 is an elevational view of the tool holding fixture, lying on one of its sides and in one of its operational positions, showing the partially ground tool bit.

Fig. 5 is a modification of the tool holding fixture shown in Figs. 1–4.

Fig. 6 is a perspective view of a standard spacing aligner to be used with the tool holding fixture.

Fig. 7 is a perspective view of a universal spacing aligner to be used with the tool holding fixture.

Fig. 8 is a top plan view of another modification of the tool holding fixture of the present invention.

Fig. 9 is a fragmentary cross-sectional view of the modified tool holding fixture of Fig. 8 taken on the line 9—9 thereof.

Fig. 10 is a fragmentary cross-sectional view of the means whereby the bridge is secured to the tool holding fixture, taken on the line 10—10 of Fig. 2.

Fig. 11 is a view in elevation showing the tool holding fixture lying on its rear surface in one of its operational positions, showing the final grinding stage.

In the embodiment of the invention shown in the drawings, the tool holding fixture comprises a body 20 for carrying the thread cutting tools or tool bits C during the grinding thereof into the desired shape. In accordance with the preferred form of the invention, the body 20 comprises an integral block-like part made of steel or other suitable paramagnetic material which is capable of use with a magnetic bed or table T which is movable back and forth across the face of a rotating grinding wheel G.

The body 20 comprises a bottom surface 22 and a top surface 24 which may be machined and finished so as to present plane surfaces which are parallel to each other. Thus, when the body 20 is placed on the table T, the bottom surface 22 rests thereon and the top surface 24 presents a plane surface parallel to the bottom surface 22 and also to the magnetic table T.

A front surface 26 extends perpendicularly to the table T between the bottom and top surfaces and may also be machined and finished to provide a plane surface. Thus, when the bottom surface 22 of the body 20 is placed on the magnetic table T, the front surface 26 will lie in a vertical plane.

As shown in Fig. 2, a rear surface 28 and two side surfaces 29, 30 extend between the bottom and top surfaces and may also be machined and finished to provide plane surfaces. These surfaces 28, 29 and 30, however, are inclined to the vertical at an angle $a$, as shown in Fig. 3. Angle $a$ is on the order of 10° but the surfaces may be machined to obtain other predetermined angles, as desired, for purposes to be disclosed hereinafter.

A bridge 32 is mounted on the top surface 24 of the body 20 for the purpose of securing the cutting tool bits C in the proper position thereon. The bridge 32 comprises two upright posts 34, 34 which may be set into the top surface 24 by any desired means. For example, as shown in Fig. 10, a tapped hole 33 may be formed in the body 20 and the posts 34, 34 may have threaded lower ends 35 to be engaged therewith and be secured in fixed position on the top surface 24. The posts 34, 34 should be perpendicular to the top surface 24 and positioned the same distances from the front surface 26. The upper ends of the posts 34, 34 may be turned down for a portion of their length to provide shoulders 37 for the reception of a bridging crossbar 40 having bored holes at its ends to fit upon the turned down lengths. A threaded portion 39 is formed on the turned down portion of the post 34 and is engaged by a locking nut 38 whereby the bridging crossbar 40 is securely fastened in proper position. The posts 34, 34 are identically formed and turned down to the same extent whereby the shoulders 37 form level abutments for the bridging crossbar 40 which thus lies in a horizontal plane parallel to the top surface 24. A threaded hole 62 is formed in the center of bridging crossbar 40 and a thumb screw 64 having a knurled head is threaded thereinto. It will be apparent from Figs. 1 and 5 that if the thumb screw 64 is rotated so as to be moved downwardly, its lower end 65 will abut and pin down any object lying on the upper surface 24 in its path.

As shown in Fig. 3, a pivot hole 42 is formed in the top surface 24 of the body 20 midway between the two tapped holes 33 and the upper portion thereof is tapered to receive a tapered pivot pin 44. This tapered pivot pin 44 is of such a length and taper that a short portion thereof protrudes beyond the top surface 24 and forms a projecting pivot pin. A rotatable tool holder 46, comprising a flat base 47 and two upstanding sides 48 has a tapered hole 50 bored in the center of its base 47 and is capable of fitting on the tapered pin 44 and rotating thereon.

The tapering of the pin 44 and hole 50 necessitates the positioning of the tool holder 46 on the top surface 24 prior to the insertion of the tapered pin 44 but it is to be observed that, once the tapered pin 44 is secured in position, the tool holder 46 is incapable of slipping upwardly off the pin 44 due to the direction of the taper. Thus, the tool holder 46 will be capable of free rotation on the tapered pin 44 without fear of slipping upwardly therefrom.

A tool bit C is positioned within the space between the sides of the tool holder 46 which sides are spaced sufficiently so as to accommodate tool bits up to ½" size. However, larger or smaller tool holders could be employed with the present invention. A set screw 52 is positioned within one wall 48 of the tool holder and may be employed to secure the tool bit in position to prevent horizontal movement. When the set screw 52 is tightened, the tool bit should be located with its center line passing over the axis of the tapered pivot pin 44 to insure a proper concentric rotation of the tool bit within the tool holder.

In the event that a smaller size tool bit, such as 5/16" or ¼", is used, spacing aligners 54 are provided for insertion between the wall 48 of the tool holder 46 and the tool bit C itself so that the tool bit will always be properly aligned. As shown in Figs. 1 and 4, such a spacing aligner 54 is shown in use with a ⅜" tool bit. The spacing aligner 54 is shown in Fig. 6 and it will be apparent that the thickness of the vertical spacing wall of the aligner is determined by the size of tool bit used so that it may be centered properly in the tool holder. By making each angular side 55, 56 of a predetermined different thickness, it is possible for one spacing aligner 54 to serve for two different sizes of tool bit C by use of the two different thicknesses with two correspondingly different tool bits.

A universal spacing aligner and tool holder 58 is shown in Fig. 7 wherein the internal walls of the aligner sides 59, 60 are provided with steps cut thereinto. The widths of the steps may be so graduated that seats are provided for the lengths of tool steel which normally come in predetermined standard sizes. As shown, the universal spacing aligner and tool holder provides smooth fitting seats for the reception of four different standard-sized tool bits. A greater, or fewer, number of stepped seats could be provided, as desired. It will be appreciated that the universal tool holder 58 will not require any individual spacing aligners nor any set screw to secure the tool bit C to prevent horizontal movement and thus provides a very simple and quick means to position the tool bit for grinding.

The lower end of the thumb screw 64 is smoothly finished as at 65 so that, when the thumb screw is rotated by means of its knurled head so as to lower the end 65, the tool bit C will be held in place thereby and locked in place against any vertical movement, or if the thumb screw is sufficiently tightened, to prevent rotational movement of the tool holder completely.

While any other desired means of securing the tool bit C against movement, such as a screw with an Allen head, can be used, the thumb nut illustrated is merely considered as an example of such means and not to be construed as limitative thereof.

The flat base 47 of the tool holder 46 extends rearwardly beyond the side walls 48, 48 as shown in Figs. 1 and 2 and forms an extending lever 47' which is capable of rotational sliding movement over the rear portion of the top surface 24. Positioning holes 68 are bored in the rear portion of top surface 24 along two circular arcs with the pivot pin 44 as a center therefor and two circular openings or holes 70, 71 of a similar size are bored in the extended portion 47' of the flat base 47 of the tool holder 46. These holes 70, 71 are bored at such a distance from the pivot pin 44 as to pass in succession over the bored positioning holes 68 in the upper surface 24 and to be momentarily aligned therewith. A locking peg 73 having a tapered end is adapted to be inserted through either of the holes 70, 71 and into the positioning holes 68 to secure the tool holder in any desired position.

The necessity for having two circular rows of positioning holes 68 and two locking peg holes 70, 71 is created by the fact that some of the standard thread angles are so close to each other as to overlap. This is particularly observed in the case of the American standard (60°) and the British standard (55°) which are so close that they must necessarily be offset from each other.

The holes 70, 71 in the tool holder 46 and the positioning holes 68 in the top surface 24 of the body 20 are tapered as shown in Fig. 3 to provide for easy insertion and removal of the peg. While an enlarged head, or other suitable means, may be provided to insure ease of gripping the peg 73, the top of the locking peg 73 is illustrated as being knurled to provide for better gripping by the hand of the machinist.

Stampings are made in the top surface 24 of the body 20 to indicate to the user the proper position for the locking of the tool holder in order to cut the desired thread angle in the tool bit. For example, positioning holes 68 have been illustrated for cutting 60° angles (American standard and the sharp V-thread); 55° angles (British standard or Whitworth); 45° angles (buttress); 29° (acme); and 0° (square threads, parting or cut-off tools and tools for cutting grooves). The tool should be held on the table at 90° to the grinding wheel to prevent compound angles.

It is to be noted that the numerical value of the angles stamped on the face 24 of the body 20 does not represent the value of the angle measured from the zero mark but rather the value of the angle included by the angular positions indicated by the same stamping. For example, there are two 60° stampings noted in Fig. 2; one above the zero mark and the other below the zero mark. Measurement of the included angle between the two 60° markings will reveal that each stamping is 30° from the zero marking to thus create a total included angle of 60° between the two indicated positions which is necessary to grind an American standard or sharp V-thread tool bit. Similarly the 29° markings are each 14½° from the zero mark to make a total included angle of 29°. The 45° marks similarly include a total angle of 45° but are positioned in unsymmetrical manner with relation to the zero mark inasmuch as the 45° buttress thread is itself not symmetrically formed with relation to the axis of the tool bit.

The manner of use of the embodiment of the invention disclosed in Figs. 1-4 is as follows: Let it be assumed that it is desired to grind a tool bit corresponding to a 60° American standard in a length of ⅜" size of tool steel and that the tool holder happens to be in the zero position at the moment. The thumb screw 64 and the set screw 52 are backed off and a length of ⅜" tool steel bit is positioned between the sides 48, 48 of the tool holder with the end to be ground projecting outwardly. The ⅜" spacing aligner is inserted between the tool bit C and the side 48 opposite that wall which contains the set screw 52. The set screw 52 is then advanced until the tool bit C is pressed snugly against the spacing aligner 54. The thumb nut 64 is then screwed downwardly until the lower end 65 thereof presses the tool bit C against the base of tool holder 46 and thus the length of tool steel is secured in position on all sides.

The fixture is laid on one side surface 29 as shown in Fig. 4, and the locking peg 73 is removed from the zero hole. The tool holder 46 is then rotated on pivot 44 until the locking peg hole 71 is aligned with the lower positioning hole 68 stamped 60° and the locking peg 73 is reinserted to secure the tool holder in that angular position which, if measured, would indicate that the tool bit C now lies at an angle of 30° to its original zero position.

If body 20 had been a solid figure wherein all the angles were right angles, such as in a cube, and if such a cube were to be laid on its side in a position analogous to that shown in Fig. 4, with the tool holder 46 holding the tool bit C at an angle of 30° to the horizontal as shown, the surface 24 upon which the tool holder is secured would lie in a vertical plane and the body of the tool holder would rotate in a vertical plane about its pivot and keep the top face 79 of the tool bit in a vertical plane at all times during such rotation. The grind stone G which presents a grinding surface operating in a horizontal plane relatively to the work would thus grind an edge 75 at an angle of 30° to the tool bit axis and a plane surface perpendicular to the top surface 79 of the tool bit.

However, it is to be noted that in the case of the body 20, the top surface 24 thereof will be inclined forwardly at an angle of 10° due to the effect of angle a, with the result that, although the edge 75 will still be ground at an angle of 30° to the axis of the tool bit, the plane surface will be ground on a plane inwardly inclined to top surface 79 at an angle of 10°, as shown in Figs. 2 and 4.

Thus, one side 75 of the desired cutting angle is ground in the length of tool bit and, at the same time, a clearance angle of 10° is formed which inclines inwardly from the cutting edge 75 to prevent friction or interference between the cutting edge 75 and the object to be cut thereby. The tool bit C should be ground down until the edge 75 meets the front surface of the tool bit C at approximately its center line, as shown in Fig. 4.

The tool holder 46 is then moved to its second position by removing peg 73 from its positioning hole and by rotating the tool holder until the other 60° positioning hole 78 is aligned with the locking peg hole 71. The peg 73 is then reinserted to secure the tool holder in its new position, in which the end of the tool bit C is depressed downwardly.

The fixture is then released from the magnetic table T and is reversed and laid on its other side surface 30 so that the unground end 81 is elevated and is in position to be ground by the grind stone G. This position has not been illustrated since it is a mere reversal of the position shown in Fig. 4. The second position brings the tool bit into position so that cutting edge 83 will be capable of being ground in similar fashion to the grinding of edge 75.

When the tool bit C has been ground until the edge 83 meets the edge 75 at the center line of the tool bit C, at 60° cutting surface will be present on the top surface 79 of the tool bit. At the same time, the two side surfaces 77 and 78 will have been ground to form two inwardly inclined surfaces slanted 10° to provide clearance for both cutting edges 75 and 83.

An angle of 10° has been chosen as illustrative of angle a but should not be construed as limitative thereof. An angle of 10° has been chosen as such is about right for tools intended for general work. Should the tool be intended for use with brass or other soft metals, clearances of 12–14 degrees may be desirable so that the tool may be fed more easily into the metal. The angle a need not necessarily be equal for all three faces (the rear and the two side faces) but may be different for all three, if desired.

The body 20 is then released from the magnetic table T and is returned to rest upon its base 22. The tool holder 46 is moved to the zero mark by removing the locking peg 73, swinging the tool holder 46 until the positioning hole 78 marked "0°" is aligned with the locking peg hole 71, and then reinserting the peg 73 to secure the tool holder 46.

In this position the top face 79 of the tool bit C is parallel to the surface of the table T and is passed under the grind stone G sufficiently merely to clear off a portion of the top front edge 85 of the tool bit. This determines the rake on the tool and in the illustrated form of the invention does not create any rake at all since the cleared surface 85 is parallel to the base of the tool bit.

The body 20 is then released from the magnetic table T and is rested upon the rear surface 28 thereof to cause the tool bit C to extend upwardly, as shown in Fig. 11. Due to the inclined nature of side 28, the axis of the tool bit C will be inclined to the vertical at an angle of 10° so that if the tool bit is passed under the grind stone G, the front edge 87 thereof will be ground down at an angle of 10° inclined inwardly from the top surface 79 or 85 to thus provide end clearance for the completed tool bit C.

The amount to be ground down from the front edge 87 of the tool bit C will depend on the amount of flat desired between adjacent threads. It is apparent that a greater amount of metal removed from the end of the tool bit will create a wider tool front edge 87 to thus create correspondingly wider flats in the thread cut by the tool bit.

It is thus seen that the side surfaces 29 and 30 automatically introduce a side clearance; that the bottom surface 22 provides for the rake, if desired; and that the rear surface 28 automatically introduces the end clearance without the necessity of any manual adjustment or regulation. The cutting angle is determined by a few simple movements and requires no complicated calculations or consideration. The number of standard thread angles which the tool holding fixture is capable of obtaining is limited only by the physical space of the top surface 24 which is available for the locating of positioning holes. Addtional locking peg holes could be provided, should additional circular rows of positioning holes be formed.

In Fig. 5 is disclosed a modified form of the invention wherein a different form of means is employed to hold the tool holding fixture in position during the grinding of the tool bit. The table T' is an ordinary table having a plane surface made of steel or other suitable paramagnetic material. The body 20b may be of any suitable metal and need not be paramagnetic. In the interests of lightness, aluminum and magnesium metals have been used with entirely satisfactory results. Located within the surfaces of the body 20b are magnets M. These magnets M are formed within the body 20b during the casting thereof so as to become substantially an integral part thereof. Pole pieces 105 may protrude beyond the surfaces of the body 20b and are machined and finished so as to present a plane surface capable of resting upon the plane table T'. If desired, the magnets M may be so formed within the body 20b as to be flush with the surfaces thereof and thus a plane surface will be presented. The magnets M are preferably made of the Alnico type and possesses sufficient attraction to the table T' so that the tool holding fixture will remain in position during the grinding of the tool bit. The advantages of such a type of tool holding fixture are many. Foremost of these is that the use of expensive equipment such as a magnetic bed or table is obviated. Any type of plane surface T' which is movable relatively to a grind stone would be sufficient.

The magnets must be placed within the four surfaces needed for the grinding of the tool bit to the proper shape. These surfaces are the two side surfaces 29b and 30b, the rear surface 28b and the bottom surface 22b. The front and top surfaces need not be so equipped with magnets inasmuch as these surfaces are never rested on the table T'.

A modified form of the tool holding fixture of the present invention is shown in Figs. 8 and 9 wherein is shown a body 20a comprising a bottom surface 22a, a top surface 24a, a front surface 26a, a rear surface 28a and two side surfaces 29a and 30a.

A bridge 32 is mounted upon the top surface 24a and is of similar construction to the bridge used in the previously described embodiment of the invention shown in Figs. 1-4. Inasmuch as the construction and operation of the bridge has been explained hereinbefore, it is not believed necessary to repeat this in detail.

The primary difference between the modification shown in Figs. 8 and 9 and that shown in Figs. 1-4 lies in the construction of the means whereby the tool holder is positioned at the proper angle upon the upper surface 24a. As shown in Fig. 8, the extended end of the tool holder 46a does not have any locking peg holes in it nor does the upper surface 24a have any positioning holes bored thereinto. The extended end 46″ of the tool holder 46a is rectangular and squared off to present two parallel sides 89 and 90 which are parallel to the axis of the tool holder 46a. Consideration of Fig. 8 will reveal that as long as thumb screw 64 is not tightened too much, the tool holder 46a may be rotated on its pivot so that the extended end 46″ of the tool holder 46a will sweep in circular fashion across the surface 24a.

Bored holes 92 are formed in the body 20a and extend vertically between the bottom surface 22a and the top surface 24a. As shown in Fig. 9, the bored hole 92 comprises an upper passage 91 and a lower passage 93 of larger diameter. A positioning pin 94 is located within each of the bored holes 92 and comprises an upper section 95 adapted to slide smoothly within the upper passage 91 of the bored hole 92, a shoulder 96 secured integrally or otherwise to the pin 94, and a lower section or spring guide stem 97 which extends downwardly into the lower passage 93 of hole 92. A compression spring 99 of a diameter to fit around the guide stem 97 and within the lower passage 93 of the bored hole 92 is mounted upon an adjustable spring seat 101 and is adapted to press the spring 99 against the shoulder 96 of the pin 94 and to urge it upwardly against the shoulder formed by the narrowing of the bored hole 92 into the upper portion 91. The spring 99 is guided by the spring guide stem 97 in this action and in this manner the pin 94 is urged upwardly to project beyond the surface 24a of the body 20a, as shown in Fig. 9.

Tapped holes 100 are formed within the sides 28a, 29a and 30a in such a fashion and of such a length as to enter the bored holes 92. A set screw 103 is threaded within each tapped hole 100 and may be manually advanced sufficiently as to abut against positioning pin 94 so as to lock it in fixed depressed position.

Consideration of Fig. 9 will show that the positioning pin 94 normally tends to be in the upper portion as shown due to the pressure exerted by spring 99. Should it be desired to lower the pin 94 so that the upper end thereof will lie beneath the surface 24a, the pin is manually depressed to the position desired and the set screw 103 is advanced to secure the pin in its depressed position.

Returning now to Fig. 8, it will be seen that the bored holes 92 and set screws 103 comprise means to raise or lower the pins 94 so as to provide stops for the rearwardly extending end 46″ of the the tool holder 46a. These bored holes 92 are preferably positioned in a circular arc with the pivot of the tool holder 46a as a center. However, should any of the holes lie too close to each other, they may be positioned in staggered relationship in two or more circular rows, such as is shown in Figs. 1 and 2 in the case of the positioning holes for the 55° position and the 60° position. The upper surface 24a is shown marked out with positions whereby thread cutting tools for a 45° thread (buttress), a 60° thread (American standard or sharp V-thread), 55° thread (Whitworth or British standard) or a 29° thread (acme) may be ground. Identifying lines are stamped in the upper surface 24a to indicate which side of the positioning pin 94 should be used as the stop to locate the rearwardly extending end 46″ of the tool holder 46a.

The operation of the thread cutting fixture shown in Figs. 8 and 9 is as follows: Let it be assumed that you wish to grind a thread cutting tool suitable to cut a 60° sharp V-thread. The length of tool steel is positioned in the tool holder 46a and secured in position by the set screw 52 which prevents relative movement of the tool holder 46a and the length of tool steel. The thumb screw 64 is worked downwardly until its lower end rests upon the length of tool steel but does not bind the same. The tool holder 46a is then positioned at some point between the two stampings 55° and the positioning pins in the holes which are stamped 60° are raised by releasing the set screws 103. The rearwardly extending end of the tool holder 46a is then rotated until one of its sides, for example, side 89 abuts against the side of the positioning pin 94. The thumb screw 64 is then tightened to hold the tool holder in that position and the fixture is ready to grind the first side of the tool bit, in the same fashion as described hereinbefore. The thumb screw 64 is then loosened and the rearwardly extending end of the tool holder 46a is rotated until its opposite side 90 contacts the other positioning pin in the other hole marked 60°. Again, the thumb screw 64 is tightened to secure the tool holder in proper position and the fixture is then ready for the second operation which is the grinding of the second side face. During the grinding of these two faces in the tool bit, the fixture is laid upon sides 30a and then 29a in similar fashion to that described hereinbefore so that the automatic grinding of a clearance angle of 10° is again possible.

The thumb screw 64 is then turned to release the tool holder 46a and, at the same time, the positioning pin 94 in the bored hole 92 which is indicated by the word "square" is elevated. The rearwardly extending end of the tool holder is rotated until the side 89 is stopped by the pin 94 at the "square" position. This is the position shown in Fig. 8 and corresponds to the position shown in Figs. 1 and 2, in which position the tool bit can have its front top surface 85 cleared off.

The tool holding fixture is then laid on its rear surface 28a which is the position corresponding to Fig. 11 and in which position the flat face on the end of the tool bit may be formed in addition to the grinding of the end clearance angle of 10°. Inasmuch as the 60° sharp V-thread does not have any flat area or crest, care must be taken not to have the tool bit C approach the grind stone G for too deep a grinding stroke whereby a flat area could be formed. The tool bit and grind stone are normally brought together slowly, and grinding, if any, is stopped before the cutting point is reached.

The grinding of the other thread cutting tools proceeds in very much the same fashion. Whenever a flat area or crest is to be ground, the face of the tool bit must be progressively checked by means of a hand gage until the desired flat or crest is obtained. The cutting angle need not be checked inasmuch as the settings on the top surface of the tool holding fixture automatically take care of that. In the same way, the side clearance and end clearance angles need not be checked inasmuch as such is introduced automatically in the grinding on the tool bit.

Variations and modifications may be made in the tool holding fixture within the scope of the claims and portions of the improvements disclosed may be used without others.

We claim:

1. A fixture for holding a tool on the table of a grinder, said fixture comprising a unitary body having a bottom surface lying in a plane; a top surface; a front surface; a plane rear surface and plane side surfaces lying in planes inclined to the top surface; and a rotatable tool holder mounted on the top surface of said body and capable of rotation about an axis substantially perpendicular to said top surface, said bottom, rear and side surfaces providing bases upon which to rest the fixture on the table of the grinder whereby the faces of the tool may be successively presented to the grinder to be ground to form cutting edges at standard thread cutting angles, and wherein the inclination of said rear and side surfaces of the body to said top surface concurrently and automatically introduces the end clearance and side clearance necessary in the faces of the tool for the proper operation of the cutting edges thereof.

2. The invention as defined in claim 1, wherein said unitary body has embedded therein magnetic materials capable of holding said fixture on the table of the grinder during the grinding of the tool.

3. A fixture for holding a tool on the table of a grinder, said fixture comprising a unitary body having a bottom surface lying in a plane; a top surface; a front surface; a plane rear surface and plane side surfaces lying in planes inclined to the top surface; a rotatable tool holder mounted on the top surface of said body; pivot means providing for rotation of said tool holder about an axis substantially perpendicular to said top surface; and locking means for securing said tool holder in predetermined angular positions corresponding to standard thread cutting angles, said bottom, rear and side surfaces providing bases upon which to rest the fixture on the table of the grinder whereby the faces of the tool may be successively presented to the grinder to be ground to form cutting edges at standard thread cutting angles, and wherein the inclination of said rear and side surfaces of the body to said top surface concurrently and automatically introduces the end clearance and side clearance necessary in the faces of the tool for the proper operation of the cutting edges thereof.

4. The invention as defined in claim 3, wherein said top surface has formed therein positioning holes and said locking means has formed therein a circular opening adapted to be aligned with said positioning holes; and a locking peg adapted to enter said circular opening and one of said positioning holes to lock the tool holder in position.

5. The invention as defined in claim 4, wherein said unitary body has embedded therein magnetic materials capable of holding said fixture on the table of the grinder during the grinding of the tool.

6. The invention as defined in claim 3, wherein said top surface has formed therein positioning holes and said locking means comprises an extending arm on said rotatable tool holder; a positioning peg within each of said positioning holes and adapted to act as a stop for said extending arm; and means to secure said extending arm in any predetermined position.

7. A fixture for holding a tool on the table of a grinder, said fixture comprising a unitary body having a bottom surface lying in a plane; a top surface; a front surface; a plane rear surface and plane side surfaces lying in planes inclined to the top surface; a rotatable tool holder mounted on the top surface of said body; means to secure a tool in said tool holder to be rotatable therewith; pivot means providing for rotation of said tool holder and tool about an axis substantially perpendicular to said top surface; and locking means for securing said tool holder in predetermined angular positions corresponding to standard thread cutting angles, said bottom, rear and side surfaces providing bases upon which to rest the fixture on the table of the grinder whereby the faces of the tool may be successively presented to the grinder to be ground to form cutting edges at standard thread cutting angles, and wherein the inclination of said rear and side surfaces of the body to said top surface concurrently and automatically introduces the end clearance and side clearance necessary in the faces of the tool for the proper operation of the cutting edges thereof.

8. A fixture for holding a tool on the table of a grinder, said fixture comprising a unitary body having a bottom surface lying in a plane; a top surface; a front surface; a plane rear surface and plane side surfaces lying in planes inclined to the top surface; a rotatable tool holder mounted on the top surface of said body and capable of rotation about an axis substantially perpendicular to said top surface; means to secure a tool in said tool holder to be rotatable therewith; and a spacing element to provide for adaptability of said tool holder to various sizes of tools, said bottom, rear and side surfaces providing bases upon which to rest the fixture on the table of the grinder whereby the faces of the tool may be successively presented to the grinder to be ground to form cutting edges at standard thread cutting angles, and wherein the inclination of said rear and side surfaces of the body to said top surface concurrently and automatically introduces the end clearance and side clearance necessary in the faces of the tool for the proper operation of the cutting edges thereof.

9. A fixture for holding a tool on the table of a grinder, said fixture comprising a unitary body having a bottom surface lying in a plane; a top surface; a front surface; a plane rear surface and plane side surfaces lying in planes inclined to the top surface; a rotatable tool holder mounted on the top surface of said body; means to secure a tool in said tool holder to be rotatable therewith; a spacing element to provide for adaptability of said tool holder to various sizes of tools; pivot means providing for rotation of said tool holder and said tool about an axis substantially perpendicular to said top surface; and locking means for securing said tool holder in predetermined angular positions corresponding to standard thread cutting angles, said bottom, rear and side surfaces providing bases upon which to rest the fixture on the table of the grinder whereby the faces of the tool may be successively presented to the grinder to be ground to form cutting edges at standard thread cutting angles, and wherein the inclination of said rear and side surfaces of the body to said top surface concurrently and automatically introduces the end clearance and side clearance necessary in the faces of the tool for the proper operation of the cutting edges thereof.

10. The invention as defined in claim 9, wherein said top surface has formed therein positioning holes and said locking means has formed therein a circular opening adapted to be aligned with said positioning holes; and a locking peg adapted to enter said circular opening and one of said positioning holes to lock the tool holder and tool in position.

11. The invention as defined in claim 10, wherein said unitary body has embedded therein magnetic materials capable of holding said fixture on the table of the grinder during the grinding of the tool.

12. The invention as defined in claim 7, wherein said top surface has formed therein positioning holes and said locking means comprises an extending arm on said rotatable tool holder; a positioning peg within each of said positioning holes and adapted to act as a stop for said extending arm; and means to secure said extending arm in any predetermined position.

13. A fixture for holding a tool on the table of a grinder, said fixture comprising a unitary body having a bottom surface lying in a plane; a top surface; a front surface; a plane rear surface and plane side surfaces lying in planes inclined to the top surface; a rotatable tool holder mounted on the top surface of said body and capable of rotation about an axis substantially perpendicular to said top surface; stepped side walls in said tool holder providing a series of seats graduated in widths and adapted to receive tools of various sizes; and means to secure a tool in a seat in said tool holder to be rotatable therewith, said bottom, rear and side surfaces providing bases upon which to rest the fixture on the table of the grinder whereby the faces of the tool may be successively presented to the grinder to be ground to form cutting edges at standard thread cutting angles, and wherein the inclination of said rear and side surfaces of the body to said top surface concurrently and automatically introduces the end clearance and side clearance necessary in the faces of the tool for the proper operation of the cutting edges thereof.

14. A fixture for holding a tool on the table of a grinder, said fixture comprising a unitary body having a plane bottom surface and a plane top surface which are parallel to each other; a front surface; a plane rear surface and plane side surfaces lying in planes inclined to the top and bottom surfaces; a rotatable tool holder mounted on the top surface of said body; means to secure a tool in said tool holder to be rotatable therewith; a spacing element to provide for adaptability of said tool holder to various sizes of tools; pivot means providing for rotation of said tool holder and said tool about an axis substantially perpendicular to said bottom and top surfaces; and locking means for securing said tool holder in predetermined angular positions corresponding to standard thread cutting angles, said bottom, rear and side surfaces providing bases upon which to rest the fixture on the table of the grinder whereby the faces of the tool may be successively presented to the grinder to be ground to form cutting edges at standard thread cutting angles, and wherein the inclination of said rear and side surfaces of the body to said top and bottom surfaces concurrently and automatically introduces the end clearance and side clearance necessary in the faces of the tool for the proper operation of the cutting edges thereof.

15. A fixture for holding a tool on the table of a grinder, said fixture comprising a unitary body having a bottom surface lying in a plane; a top surface; a front surface; a plane rear surface and plane side surfaces lying in planes inclined to the top surface; a rotatable tool holder mounted on the top surface of said body and capable of rotation about an axis substantially perpendicular to said top surface; and bridge means mounted on said top surface for holding the tool within said tool holder, said bottom, rear and side surfaces providing bases upon which to rest the fixture on the table of the grinder whereby the faces of the tool may be successively presented to the grinder to be ground to form cutting edges at standard thread cutting angles, and wherein the inclination of said rear and side surfaces of the body to said top surface concurrently and automatically introduces the end clearance and side clearance necessary in the faces of the tool for the proper operation of the cutting edges thereof.

16. A fixture for holding a tool on the table of a grinder while grinding the cutting edges thereof comprising a body having a bottom surface, a top surface, a front surface, side surfaces lying in planes inclined in only one direction to said top surface and intersecting the same in a pair of parallel lines, and a rear surface lying in a plane inclined in only one direction to said top surface and intersecting the same in a line perpendicular to said parallel lines; and a rotatably adjustable tool holder mounted on said top surface for rotation about an axis substantially perpendicular to said top surface, said bottom and inclined side and rear surfaces providing bases upon which to rest the fixture on a grinder table whereby the tool faces may be successively ground to form cutting edges having predetermined thread cutting angles established by the rotatably adjusted positions of said tool holder and having predetermined side and end clearances established by the inclination of said inclined side and rear surfaces.

17. A fixture for holding a tool on the table of a grinder while grinding the cutting edges thereof comprising a body having a bottom surface, a top surface, a front surface, a pair of side surfaces lying in planes perpendicular to said front surface and inclined in only one direction to said top surface and intersecting the same in a pair of parallel lines each extending perpendicularly to said front surface, and a rear surface lying in a plane inclined in only one direction to said top surface and intersecting the same in a line perpendicular to said parallel lines; and a rotatably adjustable tool holder mounted on said top surface for rotation about an axis substantially perpendicular to said top surface, said bottom and inclined side and rear surfaces providing bases upon which to rest the fixture on a grinder table whereby the tool faces may be successively ground to form cutting edges having predetermined thread cutting angles established by the rotatably adjusted positions of said tool holder and having predetermined side and end clearances established by the inclination of said inclined side and rear surfaces.

THEODORE PENKOFF.
LEO EGOROFF.

REFERENCES CITED

The following references are of record in the file of this patent:

UNITED STATES PATENTS

| Number | Name | Date |
|---|---|---|
| 1,304,070 | Lenz | May 20, 1919 |
| 1,308,430 | Lentatz | July 1, 1919 |
| 1,368,472 | Barth | Feb. 15, 1921 |
| 1,402,001 | Mensching | Jan. 3, 1922 |
| 1,908,155 | Jorgensen | May 9, 1933 |
| 2,410,494 | Gideon | Nov. 5, 1946 |
| 2,448,309 | Grieco | Aug. 31, 1948 |
| 2,478,766 | Lange | Aug. 9, 1949 |
| 2,539,289 | Vavrin | Jan. 23, 1951 |

FOREIGN PATENTS

| Number | Country | Date |
|---|---|---|
| 125,539 | Great Britain | Apr. 24, 1919 |
| 250,137 | Switzerland | Aug. 15, 1947 |
| 575,664 | Great Britain | Feb. 27, 1946 |
| 596,409 | Great Britain | Jan. 2, 1948 |